T. GUERRIERO.
HANDSAW ATTACHMENT.
APPLICATION FILED JULY 16, 1920.
1,411,017.
Patented Mar. 28, 1922.
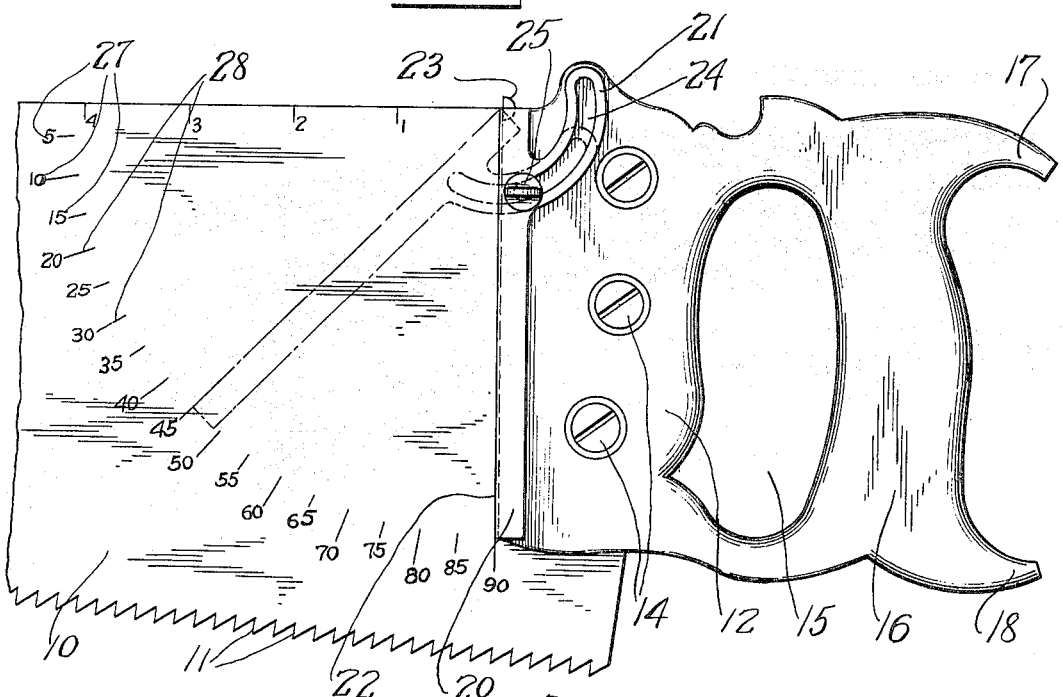
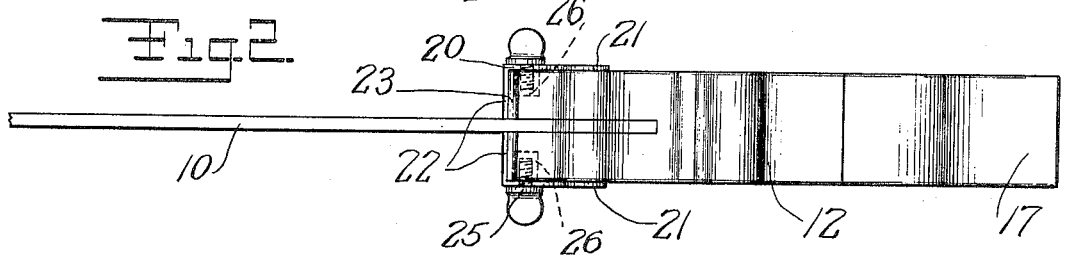
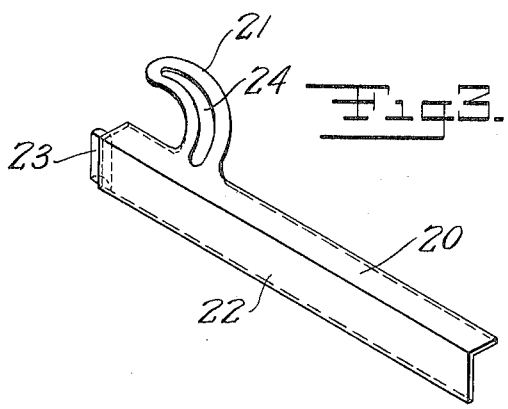
Inventor
Thomas Guerriero
By his Attorney
Eugene Pearl

UNITED STATES PATENT OFFICE.

THOMAS GUERRIERO, OF TUXEDO PARK, NEW YORK.

HANDSAW ATTACHMENT.

1,411,017.   Specification of Letters Patent.   Patented Mar. 28, 1922.

Application filed July 16, 1920. Serial No. 396,779.

*To all whom it may concern:*

Be it known that I, THOMAS GUERRIERO, a citizen of the United States, residing in Tuxedo Park, in the county of Orange and State of New York, have invented certain new and useful Improvements in Handsaw Attachments, of which the following is a specification.

The object of this invention is to provide means whereby an ordinary handsaw may be used as a square, and to lay off angles correctly and quickly without the use of other implements, and which in nowise interfere with the usual functions or handling of the saw.

A further object is to provide protective guards for the handle, preventing abrasion by contact with the material operated upon by the saw.

These and other similar objects are attained by the novel construction, combination, and arrangement of parts, hereinafter described and shown in the accompanying drawings forming a material part of this disclosure, and in which:—

Figure 1 is a side elevational view showing a conventional type of handled saw having the invention applied, Fig. 2 is a plan view of the same looking from the back of the saw, and Fig. 3 is a perspective view of the adjustable arm.

Referring to the drawings in detail, the numeral 10 designates a saw blade of the usual type having teeth 11 on its lower edge, the blade being secured in a handle 12 by the screws 14.

This handle is provided with an opening 15 to receive the fingers of a person's hand grasping the grip 16, guards 17 and 18 being formed to aid in holding the handle firmly.

The usual front portion of the handle, extending outward along the back of the saw blade and beveled as is customary, is removed, so that the front of the handle is cut squarely across and extends downward along the blade at a right angle to its back edge.

A pair of arms 20 made of flat sheet metal having curved branches 21, and formed with right-angled longitudinal flanges 22 disposed to form right and left-hand elements, are integrally provided with semicircular pivots 23 extending transversely at the ends of the flanged elements 22, these pivots being operable in corresponding recesses formed in the handle sides at their extreme upper corners and in the plane of the back of the saw blade, as indicated best in Fig. 1, the axis of the pivot being exactly at the outer corner of the angular plate arm.

An arcuate slot 24, formed concentric with the pivot 23, extends through the branch 21, in which is a clamp screw 25 having a head operable by the fingers, the threaded portion of the screw being engaged in a bushing 26 set rigidly in the handle side, in such manner that either of the plate arms may be independently clamped in adjustment.

When the arms are folded closely against the squared ends of the handle, as shown in full lines in Figs. 1 and 2, the same can be used as the hilt of a square, the blade of the saw acting as its blade for scribing and like purposes.

Upon loosening the screws 25, the arms may be rotated upon their pivots so as to form any desired angle with the back of the saw blade, and secured in such adjustment by the clamp screws in an obvious manner.

In order to lay off angles accurately a series of graduations 27 are disposed in an arc on the side of the saw blade, the same having numerals 28 indicating degrees, so that the arm may be positioned at any angle including and less than ninety degrees in an easy and rapid manner.

It will also be observed that the flanges 22, in addition to the purpose mentioned, act also as guards, preventing abrasion of the saw handle should it be thrust inadvertently forward against the work part being operated upon by the saw.

From the foregoing it will be seen that a neat, effective, and easily operated device has been disclosed, which fulfills the objects specified in a simple but adequate manner; and further, that the device can be applied to saws of existing construction without material change.

Having thus described my invention, what I claim as new and desire to secure by Letters Patent, is:—

1. In a device for laying off angles, the combination with a saw blade and a handle having its front edge square and at a right angle to the back of the blade, of an arm comprising an angular element having one of its flanges normally disposed over the side of the handle and the edge of the other flange extending to the saw blade, a pivot integral with said arm on the line of its outer edge in the handle at the back of said blade, and means for clamping said arm in adjustment.

2. In a device for laying off angles, the combination with a saw blade and a handle having its front edge square with the body of the blade and at a right angle to the back of the blade, of arms composed of angular plate flanges disposed over and at the front portion of said handle acting as guards therefor, pivots integrally carried by said arms, the axes of the pivots bisecting the outer surface of flanges adjacent the blade and the back edge of the saw, and independent means for clamping each of said arms against said handle or at an angle therefrom.

3. In a device for laying off angles, the combination with a saw of the class described, of arms having integral pivots engaging in the handle of said saw at points in axial planes bisecting their front surfaces and the back of the saw blade, graduations indicating angles radiating from the pivotal points on both sides of the blade, and means for independently clamping either of said arms when adjusted to any of said graduations.

4. In a device for laying off angles, the combination with a saw blade having a straight back edge and a handle rigidly engaged on said blade, of an arm having an integral pivot engaging at the intersection of said blade and handle at the rear edge thereof, a branch of said arm containing an arcuate slot, and means for clamping said branched arm at an angle relative to said blade.

In testimony whereof I have signed my name to this application.

THOMAS GUERRIERO.